UNITED STATES PATENT OFFICE.

ERNST F. W. WIEDA, OF PATERSON, NEW JERSEY.

METHOD OF MAKING ICE-CREAM.

1,228,152.

Specification of Letters Patent.      Patented May 29, 1917.

No Drawing.      Application filed October 6, 1915. Serial No. 54,435.

*To all whom it may concern:*

Be it known that I, ERNST F. W. WIEDA, a citizen of the United States, residing at Paterson, in the county of Passaic and State of New Jersey, have invented certain new and useful Improvements in Methods of Making Ice-Cream, of which the following is a specification.

This invention relates to the manufacture of ice cream and particularly to the forming of the ice cream mixture preliminarily to freezing. The invention has for its object to provide an ice cream mixture which will result in greater economy to the manufacturer than the usual product and which when converted into ice cream will be free from gritty or granular particles that detract from the always-desired smoothness and will also have an improved texture and taste and otherwise be superior to the ordinary product.

However smooth in texture ice cream may be when it leaves the freezer it is known that when it is allowed to stand it assumes more or less the granular character, evidently due to crystallization of the water content in isolated or detached bodies. To avoid this it has heretofore been proposed to introduce into the mixture before it is subjected to the freezing process a "binder" consisting of gelatin, gum tragacanth or some other substance which reduces the susceptibility of the water content to crystallize upon its freezing. While the product having this ingredient is less likely to assume the gritty or granular character than an ice cream mixture not having it, there is still left much room for improvement, especially where, as in the case of commercial ice cream, the cream frequently stands a considerable length of time after freezing before consumption; this is probably due to certain minute bodies of water being free of or unaffected by the binder, which is not homogeneously incorporated in the mixture and cannot be made so to be incorporated by any such relatively mild agitation as the mixture undergoes in the freezer. Of course, the crystalline bodies that form are laden more or less with the butter fat of the lacteal content of the mixture, existing as globules of more or less size.

I have ascertained that if the lacteal content and a suitable binder are each broken up into a highly divided state, as by being passed through the emulsifying or homogenizing operation, and mixed together, say by forming a mixture containing them and some other ingredient or ingredients, as sugar, and then emulsifying or homogenizing such mixture, a product is evolved which when it has been converted into ice cream is very much more free of either the gritty or granular condition or any tendency to assume such condition on standing and that the cream produced has an unusually smooth texture, is much more pleasing to the taste than ice cream made according to the usual practice and further affords a considerable economy in that, without detracting from its other qualities, a "swell" or increase of bulk occurs in the freezer that is considerably more than in the case of ordinary ice cream mixtures. These qualities I attribute to the fact that by breaking up each of the principal ingredients, the lacteal content and the binder, into a highly divided state and mixing them together, a more uniform distribution of the cream particles and a more perfect dissemination of the binder results than where a treatment in the nature of emulsification is not resorted to at all or is applied only to the lacteal content. In consequence, when the mixture is frozen in the usual way and then left to stand, since it is entirely homogeneous and regular in character, the binder being evenly distributed, crystallation is prevented from ensuing and the product is smooth in texture; further, due to the breaking up of the binder and the fat particles into a highly divided form the incorporation of air in the mixture incident to the agitation it receives in the freezer is augmented, resulting in a greatly increased "swell", while the taste is greatly improved.

It is not new to resort to emulsifying in the manufacture of ice cream. So far as I am aware, however, emulsification has only been applied to the milk and cream content, to wit, before it is introduced into the ice cream mixture. This treatment somewhat improves the ice cream made therefrom in texture and taste and makes it possible to produce ice cream at a less cost than that produced without resort to emulsification, due to augmented "swell," but the improvement in any respect is by no means as considerable as that represented by my invention. My invention is to be distinguished from treatments involving merely the emulsifying of the lacteal content of an ice cream mixture in that both the lacteal content and the binder are broken up into a highly divided state and mixed together.

An ice cream mixture, consisting of the following ingredients in the proportions named, may when treated in accordance with my process be converted into ice cream that is very superior to ice cream made by any known method, although it is appreciably less expensive than the usual ice cream mixtures:

8 pounds_____Sugar.
  ¼ pound _____Gelatin.
  6.4 quarts_____20% Cream.
  16 quarts _____Skimmilk.

After forming this mixture it is passed through an emulsifying or homogenizing apparatus, whereupon it is ready to be introduced into the freezer.

My invention is not limited to the employment of natural milk and cream; the milk and cream may be produced by some rehabilitating method, for instance, such as is disclosed in my patent for process for treating milk and milk products, No. 1,092,616.

Having thus fully described my invention, what I claim as new and desire to secure by Letters Patent is:—

1. The method herein described of making ice cream consisting in breaking up the lacteal ingredient and a binder each into a highly divided state and mixing them together, and finally freezing the mixture.

2. The hereindescribed method of making ice cream consisting in preparing a mixture containing, with the lacteal content, a binder, then breaking up the lacteal content and the binder each into a highly divided state and mixing them together, and finally freezing the mixture.

3. The hereindescribed frozen ice cream mixture containing, with the lacteal content, a binder, the binder and lacteal content being each broken up into a highly divided state and each homogeneously distributed in the mixture.

In testimony whereof I affix my signature.

ERNST F. W. WIEDA.